June 10, 1958  J. WEITS ET AL  2,838,063
TRICKLE VALVE

Filed Oct. 10, 1955  2 Sheets-Sheet 1

INVENTORS.
JOHN WEITS
HANS J. HELD
BY Arthur H. Seidel
ATTORNEY.

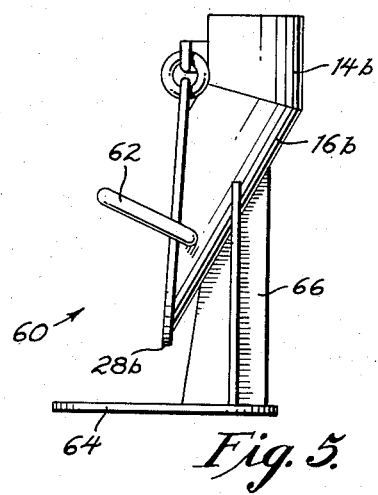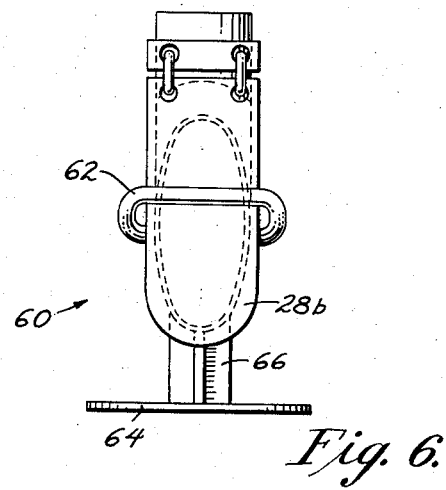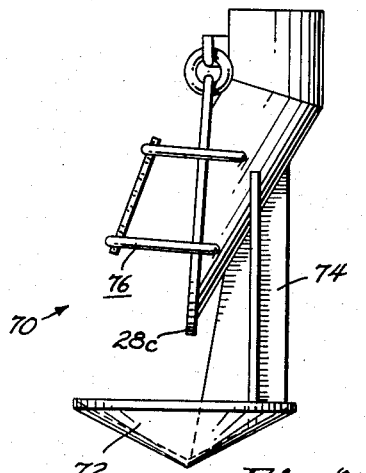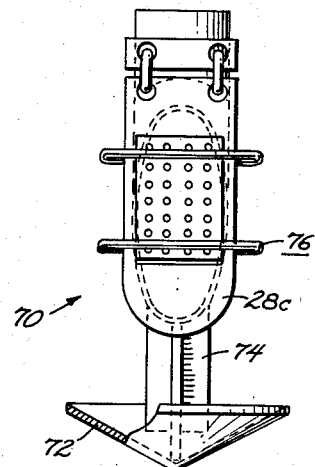

United States Patent Office 2,838,063
Patented June 10, 1958

2,838,063

TRICKLE VALVE

John Weits, Westbury, and Hans J. Held, Lake Success, N. Y., assignors to Ducon Company, Inc., Mineola, N. Y., a corporation of New York Application October 10, 1955, Serial No. 539,320

11 Claims. (Cl. 137—382)

This invention relates to a trickle valve, and more particularly to a trickle valve which may be suspended within a dense phase fluidized bed, and which may be used to control the flow of gases up through a conduit having suspended solid particles therein, while permitting the discharge of solid particles therefrom.

The so-called "fluid process" has gained widespread adoption in the petroleum and chemical industries. In this process, finely divided catalyst particles, such as catalyst particles having a mesh size of 80 mesh or smaller, are maintained suspended in a gas in the so-called "fluidized state" or "fluid state" during reaction conditions. While in this fluid state, these particles undergo the phenomenon known as hindered settling, namely they possess many of the properties of a liquid. Thus, they may be conveyed from one vessel to another through a conduit, they develop a pressure head, etc.

In petroleum technology, in particular, it is the custom to contact the reactants to be treated with particles of such catalysts under greatly elevated temperatures. For example, in petroleum cracking processes the cracking reaction is effected at a temperature in the range of 750 to 975° F. Under these high temperature conditions, contact between the crude hydrocarbon oil, normally a gas oil fraction, and the solid catalyst particles results in cracking of the crude oil fraction to desirable lower boiling products, such as gasoline and the like.

Fluid reactors, regenerators, and similar vessels must be provided with means for separating solids from gases. Such means must be positioned either in the upper portion of the reactor, or above the reactor in order to permit removal of entrained fluid catalysts from the gases, and to permit the retention of such entrained catalyst particles in the fluid vessel. Such separation means normally comprises a cyclone separator in which separation of the solid particles from the gas is effected by centrifugal motion, after which the solid particles are returned to the fluidized mass of particles within the fluid vessel, by a dip leg which descends into the fluid bed, either into the dilute phase of the fluid bed or the dense phase thereof.

Due to the flow of gas and solid particles through the cyclone separator, a pressure differential exists between the fluid vessel and the return dip leg of the cyclone separator. This pressure differential induces gaseous reactants being treated within the fluid vessel to flow upwardly through the dip leg and into the cyclone separator, instead of through the intended path—namely, through the fluid and solid inlet in the conical portion of the cyclone separator. Such upward flow through the dip leg and the cyclone separator seriously interferes with the operational efficiency of the cyclone separator and may even prevent its satisfactory operation.

Furthermore, the placing of fluid vessels in operation has required an extended starting-up period in order to establish a barometric seal between the lower portion of the cyclone separator's dip leg and the surrounding vessel. Similarly, extended starting-up periods are required when upset conditions are encountered. Inasmuch as each day off-stream may cost many thousands of dollars in the case of large fluid vessels, the elimination of extended start-up periods, and the avoidance of difficulties in effecting a barometric seal between the cyclone separator dip leg and the surrounding vessel is most desirable.

Extensive efforts have been made to develop a trickle valve which would effect a satisfactory seal between the cyclone separator dip leg and the surrounding fluid vessel. However, such prior efforts have not proved fruitful, due to the many difficulties concomitant with achieving reliable valve operation at elevated temperatures, and in environments where rust and coke build-up are encountered, and with the valve members being exposed to mixtures containing a gas and solids.

The dense phase fluidized bed within a fluid catalytic vessel is in a high state of turbulence, and the bottom end of the cyclone separator's dip leg is subjected to impingement by the rapidly moving catalyst particles within such bed. If a trickle valve is carried on the bottom end of the cyclone dip leg, such trickle valve will be exposed to such impingement, and relatively rapid erosion, or other wear and malfunction will arise therefrom.

The problems concomitant with valve operation within a fluid vessel are thus greatly increased when it is necessary or desirable to have the valve positioned within the dense phase of the fluid bed, or at the interphase between the bed's dense phase and dilute phase, rather than in the bed's dilute phase. Thus, the impingement of the turbulent dense phase fluidized particles upon the valve interferes with its satisfactory operation and may effect jamming or malfunctioning thereof. This impingement is most severe at the interphase between the dense and dilute phases. Thus, while the lower density of the catalyst at the interphase favors facile valve action, the erosion of the valve parts due to impingement caused by the high turbulence in this region may more than offset such advantage.

It is an object of the present invention to provide an improved trickle valve.

It is an additional object of the present invention to provide a trickle valve which will perform satisfactorily within a dense phase fluidized bed.

It is a different object of the present invention to provide a trickle valve which will perform satisfactorily within the interphase between the dilute and dense phases of a fluidized bed.

It is a further object of the present invention to provide a trickle valve which will perform without malfunction under greatly elevated temperatures, and in environments where rust and coke build-up are encountered.

It is another object of the present invention to provide a trickle valve useful in conjunction with the dip leg of cyclone separators or the like.

For the purpose of illustrating the invention there is shown in the drawings forms which are presently preferred; it being understood, however, that this invention is not limited to the precise arrangements and instrumentalities shown.

Figure 5 is a side elevational view of another embodiment of the trickle valve of the present invention.

Figure 6 is a side elevational view of the trickle valve embodiment shown in Figure 5, taken at 90° to Figure 5.

Figure 7 is a side elevational view of another embodiment of the trickle valve of the present invention.

Figure 8 is a side elevational view, partly in section, of the trickle valve embodiment shown in Figure 7 taken at 90° to Figure 7.

Figure 1:
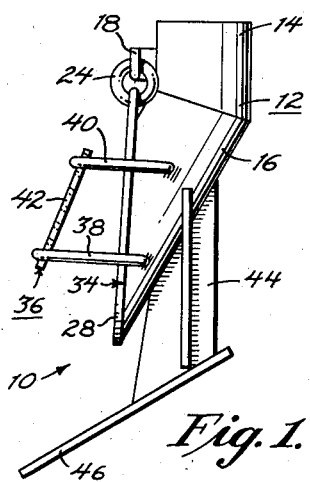
Figure 1 is a side elevational view of one embodiment of the trickle valve of the present invention.
Figure 2:
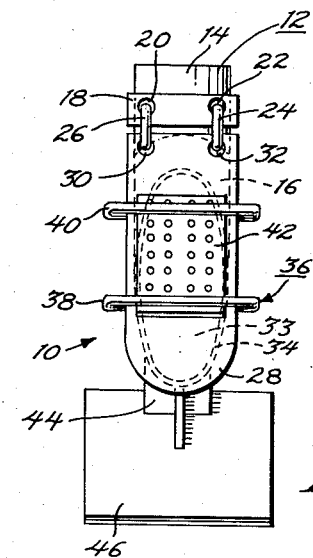
Figure 2 is a side elevational view of the trickle valve embodiment shown in Figure 1, taken at 90° to Figure 1.

Referring to the drawings and initially to Figures 1 and 2, 10 designates the trickle valve embodiment shown in these figures.

Trickle valve 10 comprises a body-member 12 consisting of an angularly bent conduit made up of portions 14 and 16; the upper portion 14 of which is lineal, and the under portion 16 of which is angularly disposed thereto at an angle to the vertical, the portions 14 and 16 forming the continuous conduit making up body member 12.

A T-shaped support bracket 18 is welded, or otherwise fixedly secured, to the outer surface of upper portion 14 of body member 12 proximate the junction with lower portion 16. The head of the T bracket 18 is a flat bar generally parallel to the axis of upper portion 14 and spaced somewhat therefrom. The T head of bracket 18 is provided with a pair of openings 20 and 22 through which respective annular or O-shaped hinges 24 and 26 are inserted. For the purposes of the present invention the diameter of the openings 20 and 22 must be appreciably greater than the diameter of the rod used for making O-shaped hinges 24 and 26, in order that O-shaped hinges 24 and 26 may move freely through openings 20 and 22 both vertically and laterally, notwithstanding the thermal expansion of the hinge metal at the valve operating temperature, which may be close to 1000° F.

A flat rectangular valve plate 28 is carried on O-shaped hinges 24 and 26, with the O-shaped hinges 24 and 26 passing through respective openings 30 and 32 in the upper portion of valve plate 28. As with openings 20 and 22, it is essential that the diameter of openings 30 and 32 be appreciably greater than the diameter of the rod used for making O-shaped hinges 24 and 26 in order to permit facile rotational movement of hinges 24 and 26 through openings 30 and 32, and also to permit lateral movement of hinges 24 and 26 in openings 30 and 32.

Valve plate 28 seats against the discharge opening 33 of lower portion 16 which is encompassed by valve seat 34. Valve plate 28 has an appreciably greater area, and greater maximum horizontal and vertical dimensions than valve seat 34, so that valve plate 28 may be seated against valve seat 34 in a plurality of laterally and vertically disposed positions. The valve plate 28 may move in a plane generally parallel to the valve seat plane or at an angle to such plane, permitting facile valve operation under adverse environmental conditions. Accordingly, the disposition of O-shaped hinges 24 and 26 within openings 20 and 22, or openings 30 and 32, to the right or left of center in respect to the centers of such openings will not adversely affect the seating of valve plate 28.

Lower portion 16 is provided with a stop designated generally by the numeral 36 consisting of a pair of bent rod bail-like stop members 38 and 40 joined by a perforated flat stop plate 42 which passes therebetween. The perforations in stop plate 42 facilitate the movement of valve plate 28 between open and closed positions, as such perforations permit the passage of gas therethrough.

In the embodiment shown in Figures 1 and 2, the plane of the outer surface of valve seat 34 is angularly disposed in respect to the vertical so that the valve plate 28 is always biased to a closed position when it is in its neutral position induced by the force of gravity. This embodiment has the advantage in that a shorter conduit above the upper portion 14 of body member 12, that is a shorter cyclone separator dip leg, need be provided to insure a given pressure head. Thus, the requisite height of fluidized solids above the discharge opening 33 of body member 12 needed to equal a predetermined head level may be reduced, since the gravity bias of valve plate 28 effects a tighter seal against valve seat 34 permitting the average density of the particles within the cyclone dip leg to be increased.

Depending from the underside of under portion 16 is a cross-flange member 44 which is welded or otherwise fixedly secured to the undersurface of under portion 16. A flat rectangular plate 46 is welded or otherwise rigidly secured to the bottom of cross-flange 44.

Flat rectangular deflector plate 46 is angularly tilted in respect to the vertical and extends a horizontal distance from the plane of valve seat 34 about equal or somewhat beyond the outermost limit of the period of movement of valve plate 28, that is plate 46 extends away from valve seat 34 a horizontal distance equal to or somewhat greater than the distance between valve seat 34 and stop plate 42.

Rectangular deflector plate 46 serves to deflect upwardly moving catalyst particles away from valve plate 28. This effect protection of valve plate 28 from injury occasioned by erosion or impingement due to rapidly rising currents of fluidized catalyst particles within the dense phase fluidized catalyst bed within which trickle valve 10 may be suspended. The operation of valve plate 28 is also likewise easened, as rectangular deflector plate 46 to some extent serves to deflect the path of the circulating fluidized catalyst bed within which valve 10 may be suspended and to more or less shield valve plate 28 from such circulating bed. This facilitates the movement of valve plate 28 from its closed position wherein it is seated on valve seat 34 to its open position wherein it is removed from valve seat 34.

Figure 3:
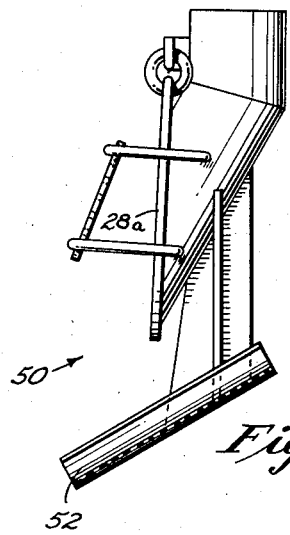
Figure 3 is a side elevational view of another embodiment of the trickle valve of the present invention.
Figure 4:
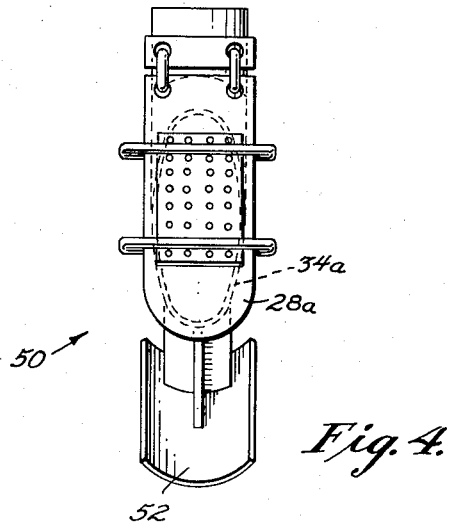
Figure 4 is a side elevational view of the trickle valve embodiment shown in Figure 3, taken at 90° to Figure 3.

The trickle valve embodiment designated 50 of the present invention shown in Figures 3 and 4 is identical to trickle valve 10, save that in place of flat rectangular deflector plate 46, an arcuate or trough-shaped deflector plate 52 is substituted. When trickle valve 50 is suspended in a dense phase fluidized bed, the curved undersurface of arcuate-shaped deflector plate 52 facilitates the upward movement of the dense phase fluidized catalyst about trickle valve embodiment 50, as the curved surface more or less serves to streamline the flow of catalyst thereabout. The undermost edge of arcuate shaped deflector plate 52 extends horizontally somewhat beyond the furthest point of travel of valve plate 28a from valve seat 34a and facilitates the protection of the valve plate 28a from rapidly rising currents of dense phase fluidized catalyst within the catalyst bed.

In the valve embodiment 60 of the present invention, shown in Figures 5 and 6, the valve structure is the same as that of valve 10 except that the stop consists of a single bail 62 welded or otherwise fixedly secured to under portion 16b, and the deflector plate 64 constitutes a flat circular metal plate which is carried on cross-flange 66 in a horizontal position. The forwardmost edge of deflector plate 64 projects beyond bail 62, and furnishes protection to valve plate 28b.

In the valve embodiment 70 of the present invention shown in Figures 7 and 8, the deflector plate 72 constitutes a hollow conical member depending from cross-flange 74 with its apex undermost. The forwardmost edge of deflector plate 72 projects beyond stop 76 and furnishes protection to valve plate 28c.

This application is a continuation-in-part of our application Serial No. 357,874, filed May 27, 1953, for "Trickle Valve for Dust Collectors," now abandoned.

The present invention may be embodied in other specific forms without departing from the spirit or essential attributes thereof and, accordingly, reference should be made to the appended claims, rather than to the foregoing specification as indicating the scope of the invention.

We claim:

1. A trickle valve including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate having an inside diameter appreciably larger than the core thickness of the rod forming said hinge, the openings in said bracket and valve plate being so much larger than the core thickness of the rod forming the hinge as to permit both lateral and rotational movement of said hinge through each of said openings, said valve plate being juxtaposedly suspended in respect to the discharge opening of said conduit, the width and length of said valve plate being appreciably greater than the maximum width and length dimensions of the discharge opening of said conduit, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the face of the valve plate juxtaposed to the discharge opening of the conduit being flat, said juxtaposed face of the valve plate seating against the edge of the discharge opening of the conduit when said valve plate is disposed in its closed position, and said juxtaposed face of the valve plate being disposed away from the edge of the discharge opening of the conduit when the valve plate is disposed in its open position, a flange depending from said conduit, and a deflector plate carried by said flange beneath the undersurface of said conduit, said deflector plate being angularly disposed to the plane of the edge of the discharge opening of the conduit against which the valve plate is seated and so positioned that the entire valve plate is superimposed over it when the valve plate is in its closed position.

2. A trickle valve in accordance with claim 1 in which the closed loop hinge is an annular hinge.

3. A trickle valve including a conduit, a bracket fixedly secured to the outer surface of said conduit, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge, the opening in said valve plate having an inside diameter appreciably larger than the core thickness of the rod forming said hinge, the openings in said bracket and valve plate being so much larger than the core thickness of the rod forming the hinge as to permit both lateral and rotational movement of said hinge through each of said openings, said valve plate being juxtaposedly suspended in respect to the discharge opening of said conduit, the width and length of said valve plate being appreciably greater than the maximum width and length dimensions of the discharge opening of said conduit, the opening in said valve plate extending between the face of said valve plate that is juxtaposed to the discharge opening of said conduit and the face opposite thereto whereby a portion of said hinge projects beyond said juxtaposed face and overlaps the portion of said conduit adjacent the discharge opening, and a portion of said hinge projects beyond the face opposite to the face juxtaposed to the discharge opening, the face of the valve plate juxtaposed to the discharge opening of the conduit being flat, said juxtaposed face of the valve plate seating against the edge of the discharge opening of the conduit when said valve plate is disposed in its closed position, and said juxtaposed face of the valve plate being disposed away from the edge of the discharge opening of the conduit when the valve plate is disposed in its open position, a stop for limiting the movement of said valve plate away from said discharge opening, a flange depending from said conduit, and a deflector plate carried by said flange beneath the undersurface of said conduit, said deflector plate being angularly disposed to the plane of the edge of the discharge opening of the conduit against which the valve plate is seated and so positioned that the entire valve plate is superimposed over it when the valve plate is in its closed position, said deflector plate having a width greater than said valve plate and extending on each side beyond the corresponding side of said valve plate, and extending beyond the vertical plane passing through the portion of said stop which engages said valve plate and which is most remote from the plane of the edge of the discharge opening of the conduit against which the valve plate is seated.

4. A trickle valve in accordance with claim 3 in which the stop comprises a perforated plate spaced from the valve plate when the valve plate is disposed in its closed position, said perforated plate being fixedly secured to the outer surface of the conduit by elements which straddle the valve plate.

5. A trickle valve in accordance with claim 3 in which the discharge opening of the conduit is positioned in respect to the valve plate so that gravity biases the valve plate to seat against the edge of the discharge opening.

6. A trickle valve in accordance with claim 3 in which the deflector plate constitutes a flat plate.

7. A trickle valve in accordance with claim 6 in which the deflector plate is a rectangular plate angularly tilted to the vertical.

8. A trickle valve in accordance with claim 6 in which the deflector plate is a horizontally-positioned circular plate.

9. A trickle valve in accordance with claim 3 in which the deflector plate has a concave-convex cross-section, with the concave portion juxtaposed to the underside of the conduit.

10. A trickle valve in accordance with claim 3 in which the deflector plate comprises a hollow cone, the apex portion of which is most remote from the conduit.

11. A trickle valve including a conduit having an upper tubular portion, joined to an angularly disposed lower portion, a discharge opening in said lower portion, the edge of said discharge opening lying in a plane generally parallel to the plane of the axis of said upper portion, a bracket fixedly secured to the outer surface of said upper portion, said bracket having a plurality of openings therein, a plurality of annular hinges, each formed from a rod having a core thickness appreciably less than the inner diameter of said openings, one of said hinges being mounted through each of the openings in said bracket, a valve plate, each of said hinges passing through an opening in the upper portion of said valve plate whereby said valve plate is suspended from said hinges, each of said openings in said valve plate having an inside diameter appreciably larger than the core thickness of the rod forming said hinges, the openings in said bracket and valve plate being so much larger than the core thickness of the rod forming the hinges as to permit both lateral and rotational movement of said hinges through each of said openings, said valve plate being juxtaposedly suspended in respect to the discharge opening of said lower portion, the width and length of said valve plate being appreciably greater than the maximum width and length dimensions of the discharge opening of said lower portion, each of the openings in said valve plate extending between the face of said valve plate that is juxtaposed to the discharge opening of said conduit and the face opposite thereto whereby a portion of each of said hinges projects beyond said juxtaposed face and overlaps the portion of said conduit adjacent the discharge opening, and a portion of each of said hinges projects beyond the face opposite to the face juxtaposed to the discharge opening, the face of the valve plate juxtaposed to the discharge opening of the lower portion being flat, said juxtaposed face of the valve plate seating against the edge of the discharge opening of the lower portion when said valve plate is disposed in its closed position, and said juxtaposed face of the valve plate being disposed away from the edge of the discharge opening of the lower portion when the valve plate is disposed in its open position, a stop for limiting the movement of said valve plate away from said discharge opening, said stop comprising a perforated plate spaced from the valve plate when the valve plate is disposed in its closed position, said perforated plate being fixedly secured to the outer surface of the conduit by elements which straddle the valve plate, a flange depending from said conduit, and a deflector plate carried by said flange beneath the undersurface of said conduit, said deflector plate being angularly disposed to the plane of the edge of the discharge opening of the conduit against which the valve plate is seated and so positioned that the entire valve plate is superimposed over it when the valve plate is in its closed position, said deflector plate having a width greater than said valve plate and extending on each side beyond the corresponding side of said valve plate, and extending beyond the vertical plane passing through the portion of said stop which engages said valve plate and which is most remote from the plane of the edge of the discharge opening of the conduit against which the valve plate is seated.

References Cited in the file of this patent

UNITED STATES PATENTS

| | | |
|---|---|---|
| 274,139 | Pietsch | Mar. 20, 1883 |
| 1,251,295 | Sherwin | Dec. 25, 1917 |
| 1,320,960 | Anderson | Nov. 4, 1919 |
| 1,710,410 | Defenbaugh | Apr. 23, 1929 |
| 2,272,655 | Briese | Feb. 10, 1942 |
| 2,612,437 | Kaulakis | Sept. 30, 1952 |
| 2,667,448 | Munday | Jan. 26, 1954 |
| 2,718,491 | Green | Sept. 20, 1955 |

FOREIGN PATENTS

| | | |
|---|---|---|
| 275,553 | Switzerland | of 1951 |
| 695,589 | Great Britain | of 1953 |